March 18, 1958 C. ZELNICK 2,826,820
HOLE GAUGES
Filed March 23, 1954

INVENTOR
Charles Zelnick.
BY Searman Harman
ATTORNEYS

United States Patent Office 2,826,820
Patented Mar. 18, 1958

2,826,820

HOLE GAUGES

Charles Zelnick, Saginaw, Mich., assignor to The Lufkin Rule Company, Saginaw, Mich.

Application March 23, 1954, Serial No. 417,983

6 Claims. (Cl. 33—178)

This invention relates to gauges and more particularly to hole gauges for measuring and checking inside surfaces, internal diameters and the like.

One of the prime objects of my invention is to improve upon devices of this nature so as to render the same more accurate, simpler in operation, and easier to use.

A further object of this invention is to design a direct reading micrometer type gauge of this kind which need not be removed from measuring or checking position to read the same.

Another object of the invention is to design a sturdy and durable precision instrument of relatively simple nature which can be very easily assembled and disassembled for repair, lubrication, and/or replacement of parts.

A further object of the invention is to design a hole gauge with a widely variable measuring range which is limited only by the length of quickly replaceable measuring cap assemblies, the device being in practice equipped with a number of cap assemblies in graduated lengths so that the range of the gauge can be extended as desired.

Another object of the invention is to design a hole gauge in which wedge elements need not be employed to effect a translation of movement. To obtain any range of measurement with wedge elements is difficult because the size of the elements must necessarily be increased to increase the range of lateral movement and would require correspondingly oversize gauges of an impractical nature.

A further object of the invention is to design a hole gauge in which the means for translating vertical movement to lateral movement comprises a plurality of balls which can be precision ground to extreme accuracy, the balls traveling in a race which can be die cast in the measuring head of the device.

A further object of the invention is to design a hole gauge which is easy to use and operates positively with a minimum of frictional resistance so that the device is sensitive to the "feel" of the operator.

A still further object of the invention is to design a hole gauge which is comprised of relatively simple parts which can be very economically manufactured and assembled.

With the above and other objects in view, the present invention consists in the combination and arrangement of parts, hereinafter more fully described, illustrated in the accompanying drawing, and more particularly pointed out in the appended claims, it being understood that changes may be made in the size, proportion and minor details of construction, without departing from the spirit, or sacrificing any of the advantages of the invention.

Figure 1:
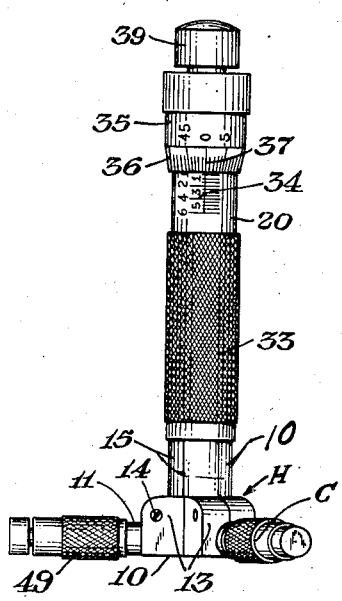
Fig. 1 is an elevational view of my hole gauge.
Figure 3:
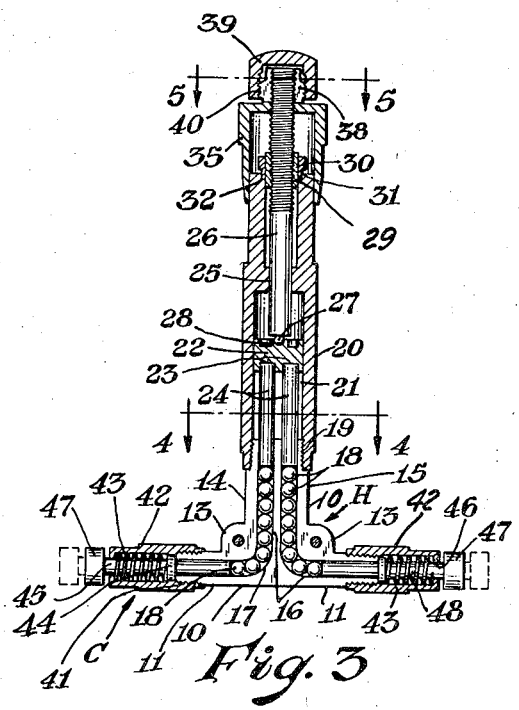
Fig. 3 is a sectional, elevational view taken on the line 3—3 of Fig. 2.
Figure 2:
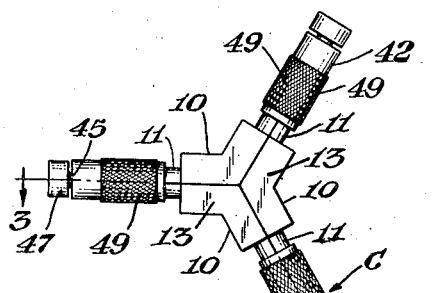
Fig. 2 is an inverted plan view thereof.

Referring now more particularly to the accompanying drawing wherein I have shown a preferred embodiment of my invention, my improved hole gauge includes a tripartite measuring head H comprised of matching sections 10 assembled in 120° angular abutting relation, the sections 10 each including semi-cylindrical leg extension portions 11 which extend outwardly from integrated leg portions 13, which are disposed in 120° angular relation. The portions 13 are bored to receive screws 14 which secure the members 10 in assembled relation and tri-cylindrical portions 15 extend vertically from the portions 13 to form a stem section for the head H when the members 10 are in assembled relation.

Formed in the abutting faces of the sections 10 are substantially right angular grooves which form ball races 16 when the members 10 are secured in abutting relation. The races 16 are curved as at 17 at the juncture of the vertical and lateral positions thereof and are open to both ends of the members 10 as clearly shown. Precesion ground balls 18 are provided in the trio of races 16 which are thus formed for a purpose which will be presently described.

Threaded on the assembled upper portions 15 of the members 10 as at 19 is a micrometer barrel 20 which is bored as at 21 to slidably accommodate a plunger 22, the plunger including recesses 23 in which rods 24 are press-fitted, the lower ends of the rods being freely accommodated in the upper ends of the races 16 in engagement with the uppermost balls 18. The interior wall of the barrel 20 is shouldered as at 25 to support the lower end of a threaded micrometer spindle 26, the lower end thereof being in bearing engagement with a hardened ball 27 which is mounted in a socket 28 in the upper end of the plunger 22. The upper end of the barrel 20 is bored as at 29 to receive an internally threaded nut 30 which is secured to the sleeve 20 by a collar 31 received in a groove 32 in the end wall of the sleeve. The lower exterior surface of the barrel 20 is conveniently knurled as at 33 and the upper end thereof is reduced and provided with a longitudinal scale 34.

Telescoped over the barrel is a sleeve member 35 including a beveled end 36 which bears a circumferential scale 37 adapted to cooperate with the scale 34. The upper end of the member 35 which is formed with a split clamping head section 38 is internally threaded to receive the threaded upper end of the micrometer spindle 26 which extends upwardly through the stationary nut 30 into the section 38. A cap 39, threaded on the split head section 38 as at 40, clamps the sleeve 35 on the spindle 26 and it will be obvious that revolution of either the cap 39 or sleeve 35 moves the spindle 26 axially relative to the nut 30 and body member 20 and actuates the plunger 22.

Readily replaceable work-engaging cap assemblies C of varying operating length dependent on the measuring range desired are threaded as at 41 on the mating leg extension portions of the members 10, the cap assemblies C including cap members or sleeve housings 42 which are bored as at 43 to slidably accommodate the enlarged collars 44 of work-engaging pin or plunger members 45 which extend outwardly of the cap members 42 through reduced passages 46 in the end walls thereof. The outer ends of the pin members 45 are formed with enlarged, work-engaging heads 47 and the inner ends are received in the ball races 16 and retained in engagement with the outermost balls 18 therein by coil springs 48 in the sleeve members 42. The springs 48 exert slight pressures on the collars 44 of the pins which maintain the latter normally in engagement with the balls 18 in the ball races. For the operator's convenience in changing the cap assemblies, the cap members or sleeves thereof are knurled as at 49.

When the gauge is inserted into the bore of a cylinder or the like to measure the internal diameter thereof, the operator twirls the cap 39 or sleeve 35 in a clockwise direction to move the spindle 26 downwardly relative to the calibrated barrel member 20. The plunger 22 is thus actuated downwardly, causing the balls 18 in the races 16 to move the measuring pins 45 outwardly into engagement with the interior wall of a workpiece. The balls constitute in effect a fluent link connecting the pins 45 and extensions 24 of the plunger 22. When the heads 47 of the pins 45 have properly engaged the interior wall, the operator is able to "feel" the increased resistance as with conventional micrometers and can take the reading without removing the gauge. The sensitivity of the device with respect to the operator's sense of "feel" is increased through the use of the ball surfaces which reduce frictional resistance, and the employment of relatively light springs 48 for returning the mechanism to original position once the measurement has been taken.

Figure 8:
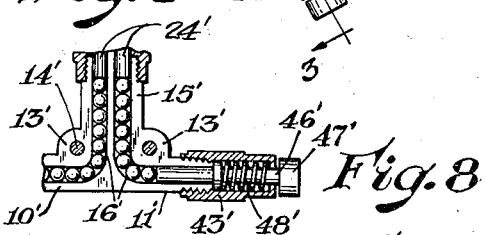
Fig. 8 is a fragmentary, sectional, elevational view thereof taken on the line 8—8 of Fig. 7.
Figure 7:
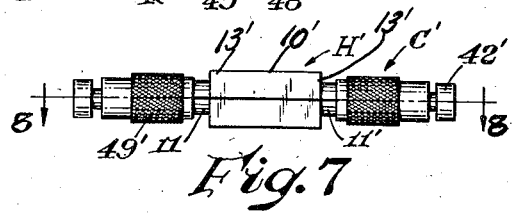
Fig. 7 is an inverted plan view of a further embodiment of the invention in which but a pair of work-engageing elements are employed.

Three work-engaging pins 45 are employed with the instant device, but obviously in other modifications of the gauge only two pins may be employed or more than three pins could be employed. A device employing but a pair of work-engaging pins is illustrated in Figs. 7 and 8, and clearly the construction will be similar, except that the head H is comprised of but a pair of matching abutting sections 10' and the stems thereof are formed of semi-cylindrical portions 15'. The leg extension portions 11' and leg portions 13' are in diametrically opposed relation and of course there are but a pair of ball races 16' and plunger extensions or rods 24'. Otherwise, the construction is identical with the gauge previously described and, of course, operates in the same manner.

Figure 6:
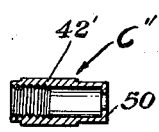
Fig. 6 is a sectional, elevational view of the cap of the cap assembly only which is shown to illustrate that the cap may replace all but one of the cap assemblies illustrated in Figs. 1–3 in a modification of the invention.
Figure 4:
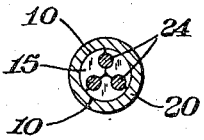
Fig. 4 is a sectional plan view taken on the line 4—4 of Fig. 3.
Figure 5:
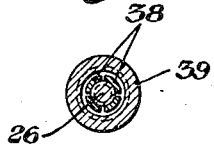
Fig. 5 is a sectional plan view taken on the line 5—5 of Fig. 3.

In some instances, one of the cap assemblies C may not be adjustable (see Fig. 6), and such a cap assembly C may comprise simply a cap member or sleeve housing 42" threaded on the leg extension portions of the device with the end wall 50 of the sleeve member 42" constituting the work engaging surface. Where but a pair of oppositely disposed cap assemblies are employed, the range of the device can be very readily varied by substituting so-called "stationary" cap assemblies of varying length.

If the plunger of a dial test indicator such as shown in Patent No. 2,345,845 is substituted in place of the micrometer spindle 26 and its spring was so adjusted that it would overcome the combined force exerted by the springs 48, the instant gauge could very easily operate as an indicator. The indicator spring would tend to maintain the plunger in the down position and the measuring pins in outward position. Readings would then be taken from the dial of the indicator in the usual manner.

It will thus be apparent that I have perfected a very practical and efficient hole gauge which is extremely accurate and yet can be manufactured more economically than conventional hole gauges.

It is to be understood that equivalent changes may be made in the various elements of the device to achieve the same or similar results without departing from the spirit of the invention or the scope of the appended claims.

What I claim is:

1. In a hole gauge, a head member for insertion into a workpiece with an opening therein, said head member having substantially right angular chambers of restricted diameter therein, said chambers being curved at the junction of the intersecting portion thereof, a tubular micrometer barrel member extending outwardly from said head member and having a longitudinal scale on the outer end thereof, a plunger reciprocable in said barrel member, said plunger having extension sections extending into the chambers in said head, work-engaging members movable outwardly from said head member to engage the interior surface of the opening in the workpiece, the inner ends of the work-engaging members being accommodated in the ends of said chambers opposite said extension sections of the plunger, a micrometer spindle threaded in said barrel member and having engagement with said plunger to actuate the same when the spindle is moved axially inwardly, a sleeve member on said spindle telescoping over said barrel member and moving said spindle relative thereto, said sleeve member having a circumferential scale adjacent the inner edge thereof cooperating with said longitudinal scale, and a plurality of solids in said chambers constituting a fluent link for transmitting movement of said spindle and plunger to said work-engaging members.

2. The combination defined in claim 1 in which three work-engaging members extend outwardly from said head member in 120° angular relation and three chambers are provided for accommodating said members.

3. The combination defined in claim 1 in which a pair of diametrically opposed, work-engaging members extend outwardly from said head member.

4. In a hole gauge, a head member for insertion into a workpiece with an opening therein, said head member being formed of a trio of separate sections secured together in 120° abutting relation, said head member having at least one angular race curved at the junction of the intersecting portions thereof, a displaceable member with one end thereof received in an end of said channel, a trio of work-engaging members extending outwardly at 120° intervals from said head members, at least one of said work-engaging members being adjustable outwardly and having its inner end accommodated in the end of said channel opposite said displaceable member, means in said race constituting a fluent link to transmit motion of said displaceable member and adjustable work-engaging member one to the other, and means for measuring the displacement of said displaceable member.

5. In a hole gauge, a tripartite head member adapted to be inserted into a workpiece having a bored opening, said head member having a trio of independent right angular ball races therein with the latter curved at the juncture of the intersecting portions thereof, a tubular micrometer barrel extending outwardly from said head member and having a longitudinal scale thereon, a plunger reciprocable in said barrel, said plunger having extensions received in said races, cap assemblies threaded on said head and extending in 120° angular relation laterally outwardly therefrom, each cap assembly including a work-engaging pin extending thereinto and reciprocable therein, the inner ends of said pins being received in said ball races opposite said extensions of the plunger, a micrometer spindle threaded in said barrel, and disposed in engagement with the inner end of said spindle, a sleeve member bearing a circumferential scale telescoped over said barrel member, said sleeve member being fixed to said spindle and movable therewith, balls in abutting relation in said races for transmitting inward movement of said spindle and plunger to said work engaging pins and spring means for returning said pins and plunger to original position when the spindle is backed off after a reading has been taken.

6. In a hole gauge, a head member for insertion into a work-piece with an opening therein, said head member having substantially angular chambers of restricted diameter therein, said chambers being curved at the junction of the intersecting portions thereof, a tubular barrel member extending outwardly from said head member, a plunger reciprocable in said barrel member, said plunger having extension sections extending into the chambers in said head member, work-engaging members movable outwardly from said head member to engage the interior surface of the opening in the workpiece, the inner ends of the work-engaging members being accommodated in the ends of said chambers opposite said extension sections of the plunger, a spindle threaded in said barrel member and having engagement with said plunger to actuate the same when the spindle is moved axially inwardly, and a plurality of solids in said chambers constituting a fluent link for transmitting movement of said spindle and plunger to said work engaging members.

References Cited in the file of this patent

UNITED STATES PATENTS

| | | |
|---|---|---|
| 1,557,846 | Kallensee | Oct. 20, 1925 |
| 1,618,173 | Daiker | Feb. 22, 1927 |
| 1,638,366 | Sandoz | Aug. 9, 1927 |
| 2,631,378 | Wynne | Mar. 17, 1953 |

FOREIGN PATENTS

| | | |
|---|---|---|
| 255,214 | Germany | Jan. 2, 1913 |
| 344,062 | Germany | Nov. 14, 1921 |
| 456,576 | Great Britain | Nov. 11, 1936 |
| 227,618 | Switzerland | Sept. 1, 1943 |
| 905,963 | France | Dec. 19, 1945 |
| 419,983 | Italy | Apr. 14, 1947 |